Patented Nov. 21, 1922.

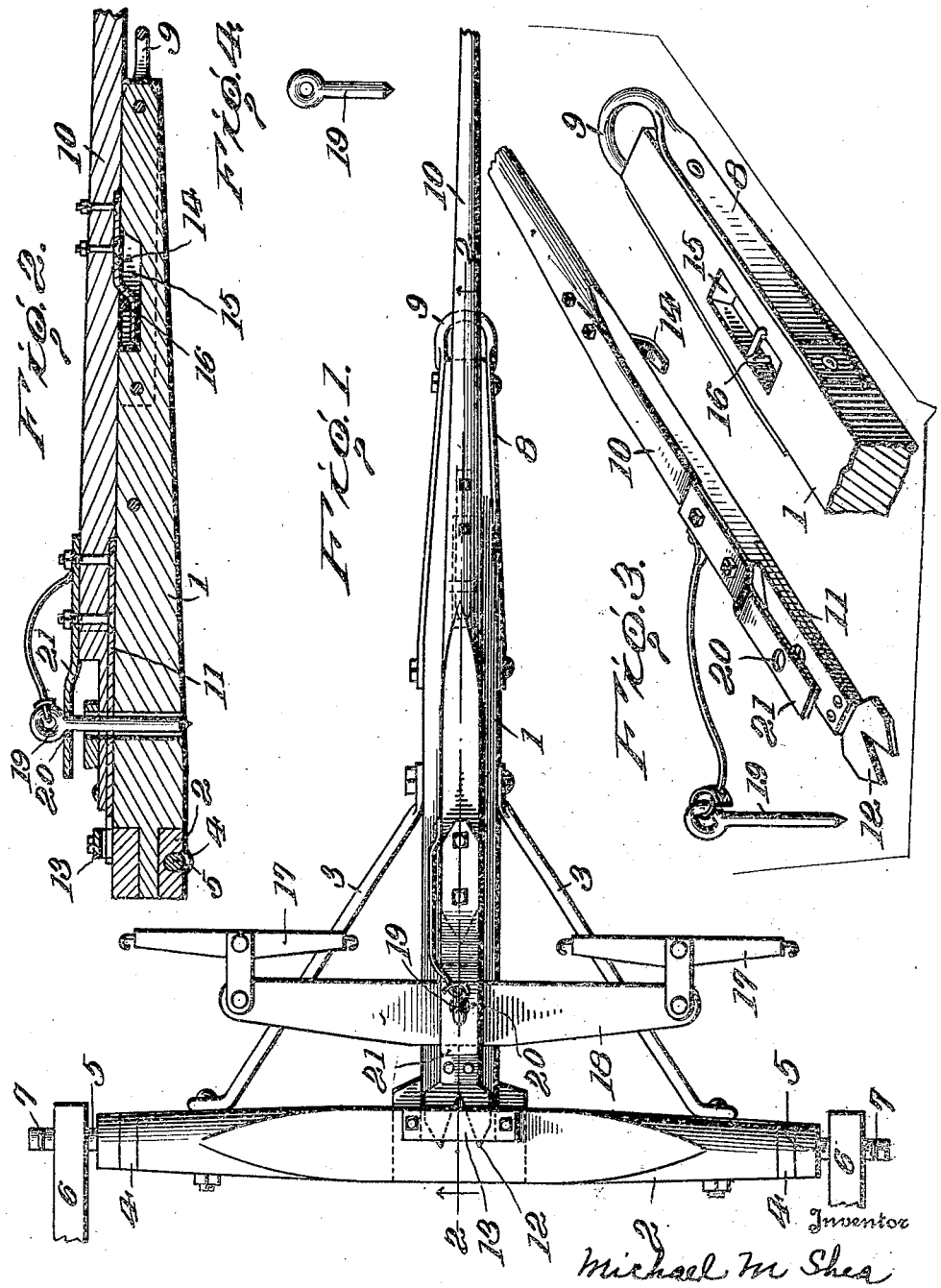

1,436,539

UNITED STATES PATENT OFFICE.

MICHAEL M. SHEA, OF POTSDAM, NEW YORK.

VEHICLE TONGUE STRUCTURE.

Application filed April 11, 1921. Serial No. 460,446.

*To all whom it may concern:*

Be it known that I, MICHAEL M. SHEA, a citizen of the United States, residing at Potsdam, in the county of St. Lawrence, State of New York, have invented certain new and useful Improvements in Vehicle Tongue Structures, of which the following is a description, reference being had to the accompanying drawing and to the figures of reference marked thereon.

The present invention relates to improvements in vehicle tongues, such as is commonly employed to connect a vehicle to a tractor, for transportation.

In logging, as practiced in winter lumber camps, the transportation of the logs is usually accomplished by sleds which loaded with logs are hauled by horses from deep in the woods, through feeder paths or ways only traversable by horses, to a wider main woods road, through which a tractor may pass.

It is customary to haul the single sleds loaded with logs by teams of horses to this main road and then a number of such sleds, five or even more, are hooked together and hauled out to the proper point by a tractor.

It is advantageous to provide detachable tongues or poles, to which a team of horses can be attached, and which with slight labor can be attached to and detached from the tongue and roll bar of the sled, which sled tongues form the connection between the sleds of a train and the tractor which hauls the same.

The detachable tongue may be readily applied to loaded sleds to enable the horses to haul them to the point where the tractor picks up a train of sleds, or it may be readily applied to the empties to draw them back to the place for loading, or may be easily dragged by the team back into the woods for attachment to a loaded sled.

The invention, therefore, consists in the matter hereinafter described and referred to in the appended claims.

In the accompanying drawings, which illustrate the invention—

Figure 1 is a plan view of a portion of the front runners of a sled, and showing the short vehicle tongue, roll bar auxiliary tongue and whiffletrees attached;

Figure 2 is a section on line 2—2 of Fig. 1;

Figure 3 is a perspective view of the auxiliary tongue and a portion of the main tongue, in detail; and Figure 4 is another view of the coupling pin.

In these drawings, 1 represents the short or main tongue which is secured to the roll bar 2 at its inner end and additionally secured thereto and braced by the angle irons 3. The roll bar 2 is provided on its lower face with a groove, in which is set and held by bands 4, the iron pivot bar 5 which passes through the side runners 6 of the sled and held by pins 7.

This construction of roll bar and mode of attachment to the sled gives the necessary vertical play to the tongue in travelling over rough ground and yet gives a rigid and sure hold against tractor and team strain, both forward and lateral.

The forward end of the main tongue has secured to it a U-bar 8, having an eye 9, by which the tractor may be coupled on, or by which the preceding sled of a train of sleds may be coupled on.

The auxiliary tongue or pole is represented generally at 10. It is considerably longer than the main tongue and much lighter, not being subjected to the severe strains of the other and being, when in use for draft purposes, auxiliary thereto.

It has a bottom plate 11, attached near its inner end, the end of such plate being enlarged and having bevelled sides to a fork 12 which fit into a clip 13 on the roll bar 2. A downwardly extending angle iron 14 fits beneath a bail 16 set into a slot 15 in the main tongue. This angle iron and the fork 12 prevent vertical displacement and side displacement of the auxiliary tongue under pulling strain of the team. The pull of the team attached to the whiffle trees 17, on the double tree 18 is transmitted from the auxiliary tongue to the main tongue by the double tree pin 19, which passes through the opening 20 in the end iron 21, the double tree and the lower iron or bottom plate 11 into the main tongue. It will be seen by this construction that, to disconnect the team from a sled, it is only necessary to pull out the pin 19 and remove the auxiliary tongue— by sliding it longitudinally of the main tongue, then by inserting the pin through the double tree and auxiliary tongue the team can drag the tongue to position for further use, and it can be readily attached to another sled—either a full one or an empty.

While a pin 19 of the length shown is used in securing the auxiliary tongue to the main tongue, I provide also a shorter pin for use when the tongue is to be dragged over the ground or snow, it being of such length as only to hold the double tree in place on the tongue and not project below the lower face of the tongue. These pins are attached to cords, as usual, to prevent loss.

Having thus described my invention, what I claim as new and desire to secure by Letters Patent, is:

1. A convertible tongue structure comprising a main tongue having means for attachment to tractor or in train and provided with a coupling hole, an auxiliary tongue having spaced plates provided with coupling holes, a double-tree adapted to be carried between the spaced plates of said auxiliary tongue and provided with a coupling hole, and a removable pin adapted to couple said main and auxiliary tongues and double-tree together.

2. In a device of the class described, the combination of a roll bar adapted to be pivotally attached to a vehicle body, a clip on said roll bar, a main tongue, having a bolt hole and a slot with the bail therein, an auxiliary tongue having a fork on its inner end adapted to engage under the clip on the roll bar and provided with a depending tongue adapted to pass under the bail in the slot on the main tongue, said auxiliary tongue also carrying spaced plates having registering perforations, a double-tree having a bolt hole, said double-tree being adapted to be carried between the spaced plates of the auxiliary tongue, and a coupling pin adapted to pass through the bolt holes of the spaced plates, the double-tree and the main tongue whereby to hold the same in detachable assembled position.

In testimony whereof, I affix my signature.

MICHAEL M. SHEA.